United States Patent

Resca et al.

[11] Patent Number: 5,099,943
[45] Date of Patent: Mar. 31, 1992

[54] DEVICE FOR ENGAGING THE FOUR WHEEL DRIVE TRANSMISSION OF A VEHICLE

[75] Inventors: Ivano Resca, San Giovanni In Persiceto; Angelo Rondelli, Cento, both of Italy

[73] Assignee: Fiatgeotech - Tecnologie Per La Terra S.p.A., Modena, Italy

[21] Appl. No.: 619,954

[22] Filed: Nov. 30, 1990

[30] Foreign Application Priority Data

Dec. 13, 1989 [IT] Italy .................. 3762 A/89

[51] Int. Cl.$^5$ .............................................. B60K 17/34
[52] U.S. Cl. ................................. 180/233; 180/247; 180/383; 464/23
[58] Field of Search ............... 180/244, 248, 197, 383, 180/384, 247, 249, 233; 403/306, 300, 364; 464/23, 160; 364/424.1

[56] References Cited

U.S. PATENT DOCUMENTS

| | | | |
|---|---|---|---|
| 3,408,830 | 11/1968 | Sutaruk et al. | 464/160 |
| 3,521,462 | 7/1970 | Heidrich | 464/160 |
| 4,723,624 | 2/1988 | Kawasaki et al. | 180/248 |
| 4,883,444 | 11/1989 | Strickler et al. | 464/160 |

FOREIGN PATENT DOCUMENTS

| | | |
|---|---|---|
| 3127605 | 1/1983 | Fed. Rep. of Germany . |
| 3621225 | 5/1987 | Fed. Rep. of Germany . |
| 3638072 | 11/1987 | Fed. Rep. of Germany . |
| 53520 | 3/1983 | Japan .................. 180/244 |
| 136521 | 8/1983 | Japan .................. 180/248 |
| 727917 | 4/1955 | United Kingdom .......... 180/248 |

Primary Examiner—Charles A. Marmor
Assistant Examiner—Kevin Hurley
Attorney, Agent, or Firm—Shlesinger, Arkwright & Garvey

[57] ABSTRACT

The device engages the four wheel drive transmission of a vehicle which comprises two transmission shafts for the rear wheels and the front wheels, a clutch installed along a front shaft and adapted, if engaged, to couple the shafts for rotation together, and a drive transmission geometry such that mechanically, with the clutch engaged, the mechanical transmission causes the front wheels to be driven slightly faster than the rear wheels. The device includes two coupling halves adapted to connect two portions of the front shaft mechanically with the possibility of relative rotation, an element adapted to translate between two end positions corresponding to positive and negative relative rotation between the coupling halves, a sensor for detecting the movement of the element, and an electric central control unit to which the sensor is connected and adapted to control engagement or disengagement of the clutch automatically.

9 Claims, 2 Drawing Sheets

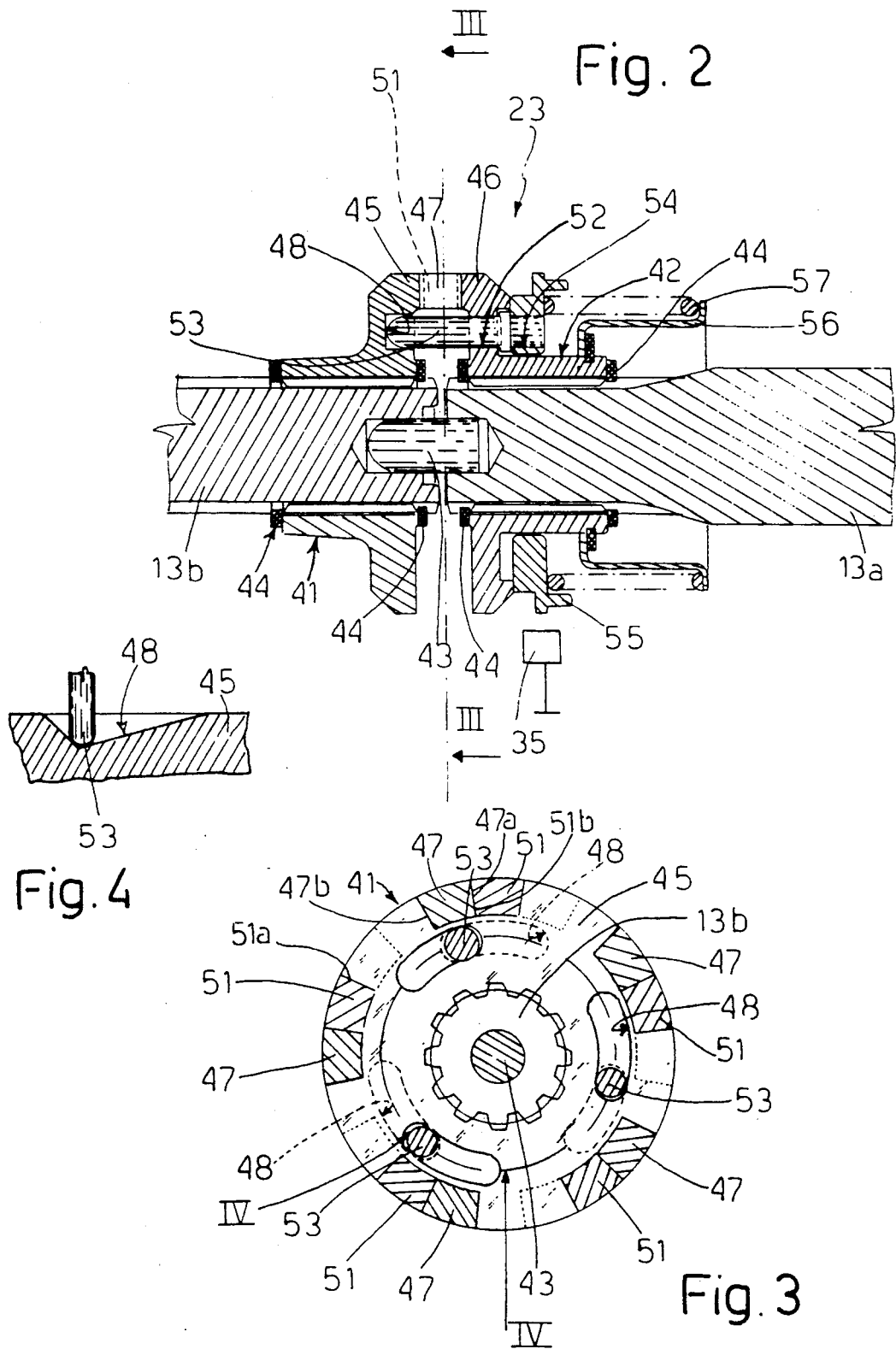

5,099,943

DEVICE FOR ENGAGING THE FOUR WHEEL DRIVE TRANSMISSION OF A VEHICLE

BACKGROUND OF THE INVENTION

The present invention relates to a device for engaging the four wheel drive transmission of a vehicle such as, for example, an agricultural tractor or an off-the-road vehicle.

It is known that in the majority of vehicles provided with a device of the type indicated above the drive wheels are the rear wheels whilst the front wheels can also become driven by effecting a mechanical connection between the rear wheel drive transmission shaft and that of the front wheels. This mechanical connection is achieved by means of an hydraulic or mechanical clutch which can be actuated with a manual control.

In an agricultural tractor provided with a conventional clutch for the four wheel drive transmission, when the clutch is engaged the front wheels are normally driven slightly faster, by about 2%, than the rear wheels. This speed differential is caused by the geometry of the transmission members fitted to the front wheels. In the field, that is when the tractor is travelling over agricultural ground, because of the low speed at which the tractor normally runs and because of the fact that the agricultural ground offers a low adhesion to the tyres, it is established that with the four wheel drive transmission engaged all the wheels may slip even by up to 10–15% with respect to the speed imposed by the engine of the tractor so that the difference in the speed between the front wheels and the rear wheels is not noticed. On asphalted roads, because the speed is normally greater than on agricultural ground, because there is a greater adhesion between the road surface and the tyres, and because in tractors the majority of the weight is supported by the rear wheels (and therefore also the traction force on the ground caused by the rear wheels is greater than that between the front wheels and the ground) when the four wheel drive transmission is engaged there is a considerable slippage of the front wheels with respect to the ground due to the speed differential imposed on these latter by the transmission kinematics. This causes a high wear on the front tyres so that on asphalted roads it is preferred to disengage the clutch and therefore maintain only the rear wheels as drive wheels. In bends, especially in those of a short radius, both in the field and on asphalted roads, the behaviour of the four wheel drive is negative. In fact, in bends with the four wheel drive engaged, even when unlocking the front wheel differential, the front wheel on the outside of the bend tends to travel by up to 20% faster than the rear wheels so that this front wheel slips causing a very considerable wear on the tyre. It is evident that the requirements of the tractor are to have the four wheel drive traction engaged in a field in all circumstances and to have the four wheel drive transmission engaged when running on roads having a high adhesion and/or with high speed only when the rear wheels lose adhesion and slip with respect to the ground. Currently these requirements of tractors can be met only by way of a manual control by the operator who naturally must be expert and able to sense the said requirements of the tractor.

SUMMARY OF THE INVENTION

The object of the present invention is that of providing a device for engaging the four wheel drive transmission of a vehicle, which automatically achieves engagement or disengagement of the four wheel drive only when the rear wheels slip with respect to the ground.

Further objects and advantages of the present invention will become evident during the course of the following description.

According to the present invention there is provided a device for engaging the four wheel drive transmission of a vehicle, which comprises a first transmission shaft for transmitting drive from an engine to two rear wheels, a second transmission shaft for transmitting drive to two front wheels, a clutch fitted in the said second shaft and adapted, when engaged, to couple the said second shaft for rotation with a toothed body, a mechanism for transmitting drive from the said first shaft to the said toothed body, and a drive transmission geometry such that mechanically, with the said clutch engaged, the mechanical transmission causes the said front wheels to be driven slightly faster than the said rear wheels, characterised by the fact that it comprises:

- a coupling fitted to the said second shaft and having two coupling halves adapted, with the possibility of relative rotation through a fraction of a revolution, mechanically to couple two parts of the said second shaft;
- an element adapted to translate, by means fitted between the said coupling halves, between two end positions one corresponding to a positive relative rotation of a first coupling half with respect to the said second coupling half and the other corresponding to a negative rotation of the said first coupling half with respect to the second;
- a sensor adapted to detect the end positions of the said element and to generate a corresponding electrical signal; and
- a central electronic processing unit to which the said sensor is connected adapted to control engagement or disengagement of the said clutch automatically on the basis of the said electrical signal.

BRIEF DESCRIPTION OF THE DRAWINGS

For a better understanding of the present invention a preferred embodiment will now be described, purely by way of non-limitative example, with reference to the attached drawings, in which:

FIG. 2 is a longitudinal section through a component of the device of FIG. 1;

FIG. 3 is a section taken on the line III—III of FIG. 2; and

FIG. 4 is a section taken on the line IV—IV of FIG. 3.

DETAILED DESCRIPTION OF THE INVENTION

Figure 1:
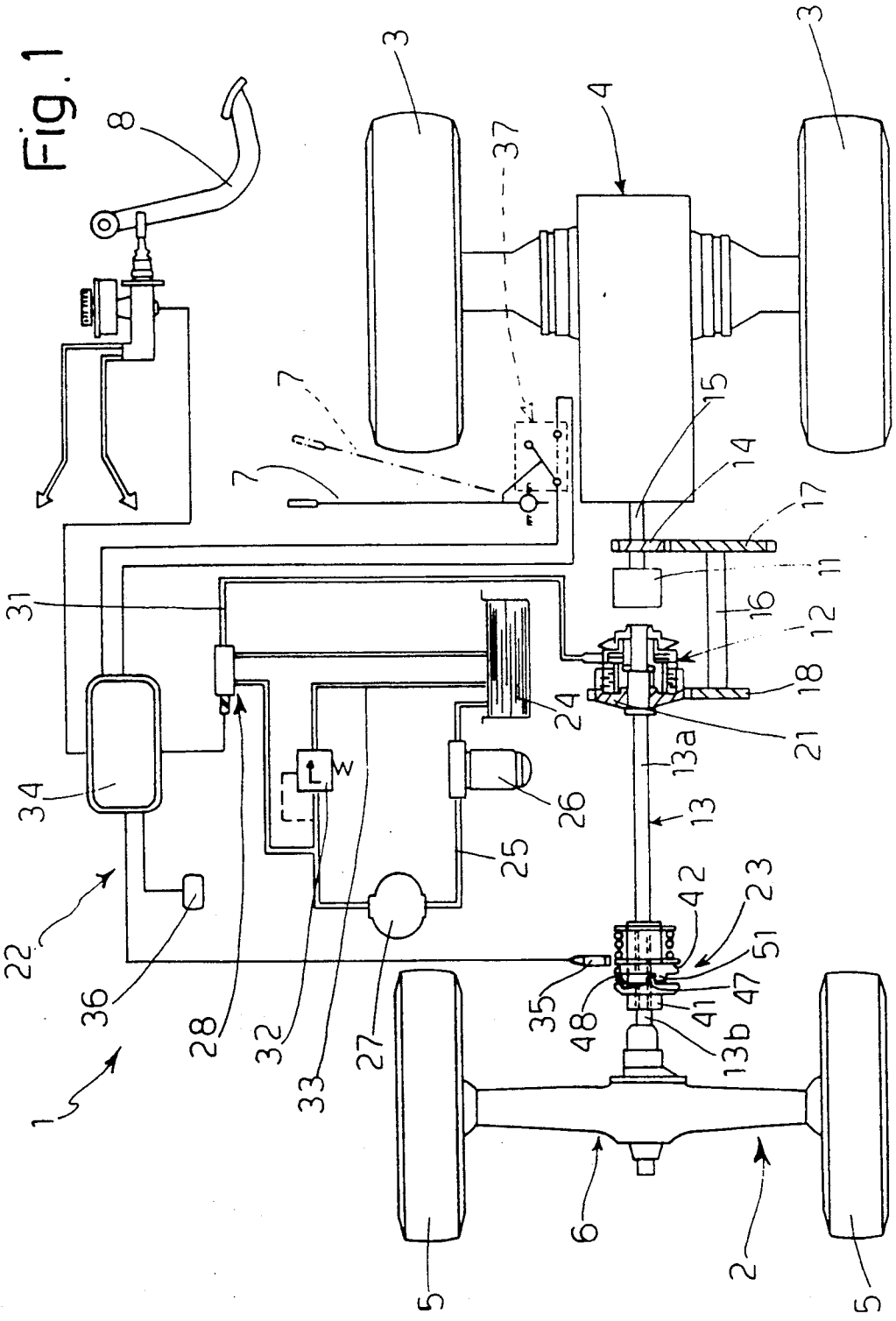
FIG. 1 is a block schematic diagram illustrating a device formed according to the principles of the present invention and fitted to a vehicle illustrated only partially.

As illustrated in FIG. 1 the reference numeral 1 generally indicates a device for engaging the four wheel drive transmission of a vehicle 2 of which only some essential parts have been schematically illustrated. In fact, only two rear wheels 3 of the vehicle 2, a rear transmission box 4 including the bevel gears, the differential, the final reduction gear and the rear half shafts, two front wheels 5, a front transmission box 6 similar to the box 4, a manual control lever 7 for engaging the reverse gear, two pedals 8, one for engaging the brake for the right rear wheel 3 and the other for engaging the brake for the left rear wheel 3, and a gear box 11. All the parts just indicated are known elements in any vehicle so these will not be described in detail but only mentioned during the description of the operation of the device 1.

With reference to FIG. 1 the device 1 comprises a hydraulically controlled clutch 12 fitted at the end of a transmission shaft 13 for the front wheels 5, a toothed wheel 14 fitted to a transmission shaft 15 for the rear wheels 3, and a rotatable shaft 16 on which is fitted a toothed wheel 17 meshing with the wheel 14 and a toothed wheel 18 meshing with a toothed body 21 of the clutch 12. This, in dependence on the controls which it receives, causes either separation between the shaft 13 and the toothed body 21 or angular coupling between these elements thus achieving transmission of drive from the shaft 15 to the shaft 13. The device 1 further includes an electrohydraulic installation 22 by means of which the clutch 12 is controlled.

The shaft 13 is formed in two coaxial portions indicated 13a and 13b and of which the portion 13a carries the clutch 12 and the portion 13b extends into the box 6. The portions 13a and 13b are mechanically connected together by means of a coupling 23 illustrated in FIGS. 2 and 3. The hydraulic part of the installation 22 comprises an oil reservoir 24, a duct 25 which dips into the reservoir 24 and in which are installed a filter 26 and a pump 27, a solenoid valve 28 adapted to allow either introduction of oil under pressure in a duct 31 which enters the housing of the clutch 12 for control of this, or discharge into the reservoir 24 of oil delivered to the box of the clutch 12. The installation 22 also includes a maximum pressure valve 32 fitted in a duct 33 branching from the duct 25 downstream from the pump 27. The electrical part of the installation 22 includes an electronic central processing unit 34 which controls the solenoid valve 28 and to which is connected : a sensor 35 fitted close to the coupling 23; electrical signals corresponding to the operation of the pedals 8; and a manually operated member 36 (for example of pulsing type) adapted to control, by means of the central control unit 34, engagement or disengagement of the clutch 12. The installation 22, for purposes which will be described hereinbelow, includes an electrical block 37 which in FIG. 1 is schematically indicated as a common relay. The block 37 is electrically connected to the central control unit 34 and is mechanically connected to the lever 7.

As illustrated in FIGS. 2 and 3, the coupling 23 includes two coaxial coupling halves 41 and 42 the coupling half 41 of which is mounted for rotation at the end of the portion 13b facing a corresponding end of the portion 13a by a splined coupling, and the coupling half 42 is joined by a similar coupling to turn with the aforementioned end of the portion 13a. Between the portions 13a and 13b is fitted a centring pin 43 and the coupling halves 41 and 42 are axially locked on the corresponding portion 13b and 13a of the shaft 13 by stop rings 44. The coupling halves 41 and 42 have respective annular flanges 45 and 46 facing one another. Orthogonally from the face of the flange 45, facing the corresponding face of the flange 46, extend five frontal teeth uniformly distributed around the peripheral rim of this face. Around an intermediate circle of the same face of the flange 45 are formed three uniformly spaced grooves 48 the axes of which longitudinally describe an arc having a circumference centred at the centre of the flange 45. From the face of the flange 46, facing the said face of the flange 45, extend five orthogonally projecting frontal teeth 51 uniformly distributed around a peripheral rim of this face. In use the teeth 47 and 51 mesh with one another and this meshing causes transmission of drive between the two portions of the shaft 13. Around an intermediate circle of the same face of the flange 46 are formed three uniformly spaced through holes 52. The intermediate circle associated with the holes 52 is equal to that of the grooves 48.

As illustrated in FIG. 4, the grooves 48 have a depth which varies along their length. In particular these grooves 48 have a first section which, starting from one end thereof, has a depth which increases linearly and a second section of extremely short length the depth of which decreases up to the second end of the groove 48. As will be described hereinbelow the essential part of the groove 48 is the first section given the negligible longitudinal extent of the second section. Naturally the conformation thus described of the groove 48 is repeated in all these in a symmetrical manner.

The coupling 23 includes three pins 53 a first, threaded axial end of which engages a respective threaded hole 54 formed in a ring 55 installed coaxially around the outside of the coupling half 42 and free to translate along the axis of this. The pins 53 traverse a corresponding hole 52 and have a second, spherical head end which contacts the inclined plane defined by the first section of a corresponding groove 48. The pins 53 are free to translate axially and by the manner of fixing of these with the ring 55 their translation causes an equal translation of this ring 55. Between the ring 55 and an annular cup 56 supported fixedly and coaxially by the coupling half 42 there is fitted a pre-loaded spring 57 which in use opposes the translation of the ring 55 in the direction of the cup 56. As will be described hereinbelow the ring 55 is translatable between two end positions associated with a positive or negative relative rotation between the coupling halves 41 and 42, so that the first end position is associated with contact of the spherical head of the pins 55 with the initial parts, of low depth, of the first section of the grooves 48, and the second is associated with contact with the part of the grooves 48 of greatest depth. The longitudinal extent of the grooves 48 is substantially proportional to the extent of the circumferential arc defined between two contiguous teeth 47 (51) and by the thickness of these latter, so that the maximum relative rotation between the two coupling halves 41 and 42 is defined by the extent of the said circumferential arc.

In a manner not illustrated there is defined in the vehicle 2 a front and rear transmission geometry such that mechanically, with the clutch 12 engaged, the mechanical transmission causes the front wheels to be driven slightly slower than the rear wheels. This speed difference is preferably about 2%. Because of this speed difference, when the vehicle 2 is in motion, with the clutch engaged and in the absence of slippage of the rear wheels 3, the portion 13b rotates slightly faster than the portion 13a and therefore the coupling half 41, rotating faster than the coupling half 42, turns through a fraction of a revolution with respect to this latter until the teeth 47 of the coupling half 41 engage with the teeth 51 of the coupling half 42. Because of this engagement the coupling halves 41 and 42, and consequently also the portions 13b and 13a rotate fixedly together. With reference to FIG. 3, and supposing a clockwise direction of rotation, one flank 47a of the teeth 47 comes into contact with one flank 51b of the teeth 51, and then remains in contact.

Before relative rotation of the coupling half 41 with respect to the coupling half 42, the spherical heads of the pins 53 occupied the corresponding grooves 48 at the point of greatest depth of these, so that during this rotation the pins 53, by the engagement of their heads with the inclined plane defined in the grooves 48, are translated towards the cup 56. The ring 55 being fixed to the pins 53 is also translated, against the action of the spring 57, towards the cup 56.

The sensor 35 is a member adapted to detect the presence of a body or a projection of the body in a determined relative position. This sensor 35 can be one of various types but in any case can be termed a proximity switch. Translation of the ring 55 from the initial position illustrated in FIG. 2 means that the sensor 35, which no longer detects the presence of the ring 55, generates an electrical signal which is sent to the central control unit 34. This, upon reception of this electrical signal controls excitation of the solenoid valve 28, through which is effected delivery of oil under pressure to the clutch 12, which in the exemplary embodiment is held closed by metal springs. Because o this the clutch 12 opens interrupting the mechanical connection between the portion 13a and the body 21 and therefore causing disconnection of the front wheel drive, with that of the rear wheels naturally remaining. In the situation just described the speed differential caused by the geometry of the front wheel transmission with respect to that of the rear wheels is now absorbed by the discs within the clutch 12, which is in this case open.

It is to be noted that even when the clutch 12 is disengaged the portion 13a presents a small resistance to free rotation because of a small residual couple inherent in the clutch 12. This residual couple maintains the coupling halves 41 and 42 in the described position so that the pins 53 remain withdrawn from the respective grooves 48, maintaining the clutch 12 disengaged by means of the sensor 35, the central control unit 34 and the solenoid valve 28.

With the clutch 12 disengaged, when the rear wheels 3 slip it happens that the front wheels 5, which are free, rotate more slowly than the rear wheels 3. Consequently the coupling half 41 has a relative rotation with respect to the coupling half 42 in a direction contrary to that previously indicated until the teeth 47 engage the teeth 51; the flanks 47b of the teeth 47 now come into contact with the flanks 51a of the teeth 51. In this case, with the aid of the spring 57, the pins 53 translate towards the part of greatest depth of the corresponding groove 48, causing a translation of the ring 55 which is therefore brought to a position directly facing the sensor 35. The axial displacement of the ring 55 causes the sensor 35 to intervene and, by means of the central control unit 34, causes commutation of the solenoid valve 28 which discharges hydraulic fluid from the clutch 12 causing engagement of the clutch. This therefore effects mechanical connection of the front wheel drive with that of the rear wheels and therefore divides the torque available from the vehicle engine 2 between the rear wheels and front wheels. Naturally as soon as the rear wheels 3 recover adhesion with the ground and there is no longer slippage between these wheels 3 and the ground, the conditions with the front wheels 5 being driven slightly faster than the rear wheels 3 occurs again and, as described above, the clutch 12 is therefore automatically disengaged.

When travelling in a curve with the clutch 12 disengaged, the front wheels 5 again travel faster than the rear wheels 3 so that the clutch 12 remains disengaged. However, if when travelling in a curve the front wheels 5 should slow with respect to the rear wheels 3 for any reason whatsoever, since this slowing indicates that the rear wheels 3 are being subject to slipping, the clutch 12 is automatically engaged even when travelling in a curve.

To obtain a correct operation of the device 1 even during reversing, this device 1 is provided with an inverter relay or changeover which in FIG. 1 has been shown schematically and indicated with reference numeral 37, which is connected in the electrical part 22 of the installation. This relay is operated by the manual lever 7 by which the operator chooses between the forward and reverse ranges. In the case of reversing the relay controls reversal of the electrical signals generated by the sensor 35 in such a way that for example if the rear wheels 33 slip with respect to the front wheels 5 it automatically controls the engagement of the clutch 12.

The member 36 is used by the operator to control manually the engagement or disengagement of the clutch 12 and therefore is an emergency device with which it is possible to compensate on given occasions any possible incorrect operation of the device 1. The actuation of one or both of the pedals 8 controls the brake of the rear wheels 3 and, by means of the central control unit 34, controls engagement of the clutch 12. In this way on the road by actuating both pedals 8 the braking is shared also by the front wheels 5 with all the advantage which follow therefrom. Moreover the reliability of the electrical parts of the installation 22 is increased in that in the case of breakdown of the electrical connection lines between a pedal 8 and the central control unit 34 the branch electrical line from the other pedal 8 controls the engagement of the clutch 12. Actuation of a single pedal 8, which it will be recalled is used mostly in the field to effect steering in tight corners, by effecting engagement of the clutch 12 causes as experienced a reduction in the steering radius.

From what has been described the advantages achieved by the present invention are evident and numerous.

In particular, the device 1 senses the requirements of the vehicle 2 and on the basis of these requirements controls and automatically engages or disengages the clutch 12, that is rear wheel drive alone or four wheel drive. Moreover correct operation is allowed even in reverse. Finally it will be evident that the device 1 is of simple construction and low manufacturing cost.

Finally, it will be clear that the device 1 described and illustrated here can have modifications and variations introduced thereto without by this departing from the protective ambit of the present invention.

We claim:

1. A device for engaging the four wheel drive transmission (2) of a vehicle, which comprises a first transmission shaft (15) for transmitting drive from an engine to two rear wheels (3), a second transmission shaft (13) for transmitting drive to two front wheels (5), a clutch (12) installed along the said second shaft (13) and acting, when engaged, to couple the said second shaft (13) for rotation with a toothed body (21), a mechanism (14, 17, 16 and 18) for transmitting drive from the said first shaft

(15) to the said toothed body (21), and a drive transmission geometry such that, with the said clutch (12) engaged, the mechanical transmission causes the said front wheels (5) to be driven slightly faster than the rear wheels (3), characterised by the fact that it comprises: a coupling (23) fitted to the said second shaft (13) and having two coupling halves (41) and (42) adapted, with the possibility of relative rotation through a fraction of a revolution, mechanically to couple two parts (13b) and (13a) of the said second shaft (13);

an element (55) adapted to translate, via means (53) installed between the said coupling halves (41) and (42), between two end positions one corresponding to positive relative rotation of a first coupling half (41) with respect to the said second coupling half (42) and the other corresponding to a negative rotation of the said first coupling half (41) with respect to the second; a sensor (35) adapted to detect the end positions of the said element (55) and to generate an electrical signal corresponding thereto; and an electronic central processing unit (35) to which the said sensor (35) is connected, adapted to control engagement or disengagement of the said clutch (12) automatically, on the basis of the said electrical signal.

2. A device according to claim 1, characterised by the fact that the said coupling halves (41 and 42) have respective frontal teeth (47 and 51) adapted to mesh together to effect mechanical connection between the said portions (13b and 13a).

3. A device according to claim 2, characterised by the fact that the said frontal teeth (47 and 51) are equal in number and distributed uniformly around respective said coupling halves (41 and 42).

4. A device according to claim 3, characterised by the fact that the said first coupling half (41) is fixed for rotation to a first said portion (13b) and has an annular flange (45) the frontal face of which has respective frontal teeth (47) on a peripheral rim thereof and grooves (48) of a depth varying substantially in a linear manner on an inner circle.

5. A device according to claim 4, characterised by the fact that the said second coupling half (42) is fixed for rotation to the said second portion (13a) and has an annular flange the frontal face of which has respective frontal teeth (51) on a peripheral rim and, around an inner circle, through holes (52) equal in number to the said grooves (48) and traversed by respective pins (53) adapted to cooperate with the inclined plane defined by the interior of the corresponding said groove (48) to assume two axial end positions corresponding to the positive or negative relative rotation between the said coupling halves (41 and 42) which occur before meshing of the teeth (47 and 51) thereof.

6. A device according to claim 5, characterised by the fact that the said element includes a flat plate (55) fixed to the said pins (53) and adapted to translate with these against the action of spring means (57).

7. A device according to claim 1,
    characterised by the fact that it includes an hydraulic system (22) enabled by the said central control unit (34) and operable to control hydraulically the engagement and disengagement of the said clutch (12).

8. A device according to claim 1,
    characterised by the fact that it includes an electrical block (37) electrically connected to the said central control unit (34) and mechanically connected to a manual lever (7) for engagement of reverse gears; the said block (37) being adapted to control inversion of the electrical signal generated by the said sensor (35) in such a way that, for example if the said rear wheels (3) slip with respect to the said front wheels (5) the said central control unit (34) automatically controls engagement of the said clutch (12).

9. A device according to claim 1,
    characterised by the fact that the said central control unit (34) is connected to a member (36) for emergency manual control of the engagement and disengagement of the said clutch (12), to receive electrical signals generated by the actuation of rear wheel brake pedals (8), and adapted to control engagement of the said clutch 912).

* * * * *